US009216922B2

(12) United States Patent
Ando et al.

(10) Patent No.: US 9,216,922 B2
(45) Date of Patent: Dec. 22, 2015

(54) GRANULES AND METHOD FOR THEIR PRODUCTION, METHOD FOR PRODUCING MOLTEN GLASS, AND METHOD FOR PRODUCING GLASS PRODUCT

(71) Applicant: ASAHI GLASS COMPANY, LIMITED, Chiyoda-ku (JP)

(72) Inventors: Ryota Ando, Tokyo (JP); Nobuhiro Shinohara, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 130 days.

(21) Appl. No.: 14/088,879

(22) Filed: Nov. 25, 2013

(65) Prior Publication Data

US 2014/0083139 A1 Mar. 27, 2014

Related U.S. Application Data

(63) Continuation of application No. PCT/JP2012/063364, filed on May 24, 2012.

(30) Foreign Application Priority Data

May 25, 2011 (JP) ................................ 2011-117147

(51) Int. Cl.

| | |
|---|---|
| ***C03C 1/00*** | (2006.01) |
| ***C03C 3/091*** | (2006.01) |
| ***C03B 1/02*** | (2006.01) |
| ***C03B 3/02*** | (2006.01) |
| ***C03C 12/00*** | (2006.01) |
| ***C03C 1/02*** | (2006.01) |

(52) U.S. Cl.

CPC ... *C03B 1/02* (2013.01); *C03B 3/02* (2013.01); *C03B 3/026* (2013.01); *C03C 1/00* (2013.01); *C03C 1/026* (2013.01); *C03C 3/091* (2013.01); *C03C 12/00* (2013.01)

(58) Field of Classification Search

CPC ............ C03C 1/00; C03C 1/02; C03C 1/026; C03C 12/00; C03C 3/091; C03B 1/02; C03B 3/02

See application file for complete search history.

(56) References Cited

U.S. PATENT DOCUMENTS

| | | | |
|---|---|---|---|
| 2012/0144863 | A1 | 6/2012 | Shinohara et al. |
| 2013/0247617 | A1 | 9/2013 | Shinohara |

FOREIGN PATENT DOCUMENTS

| | | |
|---|---|---|
| JP | 47-23404 | 10/1972 |
| JP | 51-75711 | 6/1976 |
| JP | 2009-527455 | 7/2009 |
| JP | 2009-179508 | 8/2009 |
| WO | 2011/024913 | 3/2011 |
| WO | 2012/039327 | 3/2012 |

OTHER PUBLICATIONS

International Search Report issued Aug. 28, 2012 in PCT/JP2012/063364 filed May 24, 2012.

*Primary Examiner* — Anthony J Green
*Assistant Examiner* — Elizabeth A Bolden
(74) *Attorney, Agent, or Firm* — Oblon, McClelland, Maier & Neustadt, L.L.P.

(57) ABSTRACT

Granules of a glass raw material mixture, for producing alkali-free glass containing substantially no alkali metal oxides, such that the glass composition of glass obtained from the granules comprises, as represented by mol % based on oxides, 60-75 mol % of $SiO_2$, 5-15 mol % of $Al_2O_3$, 1-9 mol % of $B_2O_3$, 0-15 mol % of MgO, 0-20 mol % of CaO, 0-12 mol % of SrO and 0-21 mol % of BaO, provided that the total of CaO, SrO and BaO is more than 0, and in an X-ray diffraction spectrum of the granules obtained by means of a CuKα ray, when the diffraction peak area of quartz (100) in a range of 2θ being 19.85-21.71 degrees is taken as 1, the total of the relative values of the diffraction peak areas of strontium borate hydrate, calcium borate hydrate and barium borate hydrate, is at least 0.005.

15 Claims, 5 Drawing Sheets

GRANULES AND METHOD FOR THEIR PRODUCTION, METHOD FOR PRODUCING MOLTEN GLASS, AND METHOD FOR PRODUCING GLASS PRODUCT

TECHNICAL FIELD

The present invention relates to granules to be used as raw material for alkali-free glass, a method for producing such granules, a method for producing molten glass by using such granules, and a method for producing a glass product by using such a method for producing molten glass.

BACKGROUND ART

Alkali-free glass containing substantially no alkali metal oxides is used for various display glass substrates, etc. Further, recently, due to e.g. diversification of characteristics required for alkali-free glass, alkali-free glass with various compositions has been used, such as glass having a less $B_2O_3$ content than before.

In such alkali-free glass, silica raw material having a high melting point is used in a large amount as compared with common soda lime glass and an alkali component to facilitate melting of such silica raw material is not employed, whereby non-molten raw material is likely to remain, and uniformity of the glass composition tends to be low.

Further, a display glass substrate is required to have a high quality such that it does not have defects (such as bubbles, striae, inclusions, non-molten substances, pits, flaws, etc.) inside or on the surface of the glass substrate, which are influential over display presentation. In order not to let non-molten raw material remain inside of the glass substrate, it is considered effective to finely pulverize the raw material powder. However, if it is attempted to put fine raw material powder into a melting furnace, there will be such problems that due to scattering of the raw material powder, the glass composition tends to be unstable, and the raw material is wasted.

As a method for solving such problems, Patent Documents 1 and 2 disclose a method wherein raw material powder is granulated for use in the production of alkali-free glass.

PRIOR ART DOCUMENTS

Patent Documents

Patent Document 1: JP-A-51-75711
Patent Document 2: JP-A-2009-179508

DISCLOSURE OF INVENTION

Technical Problem

If the strength of granules of raw material powder of glass is insufficient, the granules will undergo breakage during their use and form fine powder. If such fine powder is formed, there will be a problem such that a part of the powder scatters. Further, such fine powder is likely to surface in molten glass melted in a melting furnace, whereby non-molten material is likely to be formed, and uniformity of the composition in the molten glass or in a glass product obtained by forming it tends to be deteriorated.

For example, in an in-flight melting method to melt granules in a gas phase atmosphere, fine powder is likely to drift and scatter in an in-flight heating apparatus or in a pneumatically conveying apparatus to pneumatically convey granules, whereby the fine powder is likely to be discharged out of the in-flight heating apparatus. Therefore, if granules having low strength are supplied to the in-flight heating apparatus, the composition of molten glass thereby obtained tends to vary, and uniformity of the composition in the molten glass or in a glass product obtained by forming it, tends to be deteriorated.

The present inventors attempted to produce alkali-free glass by using the method disclosed in Patent Document 2, but granules having high strength were not obtainable depending upon the glass composition, and uniformity of the glass composition tended to be insufficient. Specifically, the strength of granules became insufficient especially in a case where the $B_2O_3$ content in the glass composition was small and in a case where the MgO content was relatively large.

As a method to improve the strength of granules, a method of using an organic binder such as a polyvinyl alcohol, is available. However, the carbon derived from the organic binder acts as a reducing agent, whereby there is a problem such that coloration is likely to result due to the reduction reaction of the glass components.

The present invention has been made in view of the above-mentioned situation, and it is an object of the present invention to provide granules having little or no content of an organic binder and being excellent in strength, and a method for their production.

Further, it is another object of the present invention to provide a method for producing molten glass by using such granules, and a method for producing a glass product.

Solution to Problem

The present invention provides the following:

[1] Granules of a glass raw material mixture, such that glass obtained from the granules is alkali-free glass having the following glass composition containing substantially no alkali metal oxides, Glass composition (represented by mol % based on oxides):

$SiO_2$: from 60 to 75 mol %,
$Al_2O_3$: from 5 to 15 mol %,
$B_2O_3$: from 1 to 9 mol %,
MgO: from 0 to 15 mol %,
CaO: from 0 to 20 mol %,
SrO: from 0 to 12 mol %,
BaO: from 0 to 21 mol %, provided that the total of CaO, SrO and BaO is more than 0 mol %;

the granules contain at least one member selected from the group consisting of strontium borate hydrate, calcium borate hydrate and barium borate hydrate; and in an X-ray diffraction spectrum of the granules obtained by means of a CuKα ray, when the diffraction peak area of quartz (100) in a range of 2θ being from 19.85 to 21.71 degrees is taken as 1, the total of the relative value of the diffraction peak area of strontium borate hydrate in a range of 2θ being from 10.81 to 13.01 degrees, the relative value of the diffraction peak area of calcium borate hydrate in a range of 2θ being from 11.11 to 13.49 degrees, and the relative value of the diffraction peak area of barium borate hydrate in a range of 2θ being from 10.91 to 13.27 degrees, is at least 0.005.

[2] The granules according to [1], wherein in the glass composition, BaO is 0 mol %.

[3] The granules according to [2], wherein in the glass composition, SrO is more than 0 mol %, and the total of the relative values of the diffraction peak areas is at least 0.03.

[4] The granules according to [2], wherein in the glass composition, SrO is 0 mol % and CaO is more than 0%, and the relative value of the diffraction peak area is at least 0.008.

[5] The granules according to [1], wherein in the glass composition, BaO is more than 0 mol %, and the total of the relative values of the diffraction peak areas is at least 0.02.

[6] The granules according to any one of [1] to [5], wherein D50 representing a cumulative weight median diameter in a particle size distribution curve of the granules is at least 1.0 mm.

[7] A method for producing the granules as defined in any one of [1] to [6], which comprises granulating a raw material powder containing a silicon source, an aluminum source, a boron source, a magnesium source and an alkaline earth metal source in the presence of water, wherein at least a part of the boron source is boron oxide or boric acid, and at least a part of the alkaline earth metal source is a carbonate of the alkaline earth metal.

[8] The method according to [7], wherein the granulation is followed by heating and drying.

[9] The method according to [7] or [8], wherein the raw material powder contains, as represented by mass percentage, from 48 to 52% of silica sand, from 2 to 13% of boric acid as calculated as orthoboric acid, from 13 to 17% of aluminum oxide, from 3 to 12% of dolomite, and from 7 to 36% in total of at least one alkaline earth metal carbonate, and in a case where a magnesium source is contained, the total content of MgO, $Mg(OH)_2$ and $MgCO_3$ is from 0 to 4%.

[10] The method according to any one of [7] to [9], wherein the raw material powder contains at least one member selected from the group consisting of $MgCl_2$, $MgF_2$ and $MgSO_4$.

[11] The method according to any one of [7] to [10], wherein the alkaline earth metal source contains no hydroxide of an alkaline earth metal.

[12] A method for producing molten glass, which comprises heating the granules as defined in any one of [1] to [6] to form molten glass.

[13] The method for producing molten glass according to [12], wherein the granules are introduced onto a molten glass liquid surface in a melting furnace and melted.

[14] The method for producing molten glass according to [12], wherein the granules are melted in a gas phase atmosphere to form molten glass particles, and the molten glass particles are collected.

[15] A method for producing a glass product, which comprises forming the molten glass obtained by the method for producing molten glass as defined in any one of [12] to [14], followed by annealing.

Advantageous Effects of Invention

According to the present invention, it is possible to obtain granules excellent in strength even though the granules contains little or no organic binder.

By using the granules of the present invention, it is possible to prevent scattering of the raw material powder in the production of molten glass or in the production of a glass product, while overcoming the problem of coloration of glass due to an organic binder. Further, since the strength of the granules is excellent, it is possible to prevent scattering of fine powder and it is possible to produce molten glass or a glass product excellent in the uniformity of the composition.

DESCRIPTION OF EMBODIMENTS

Figure 1:
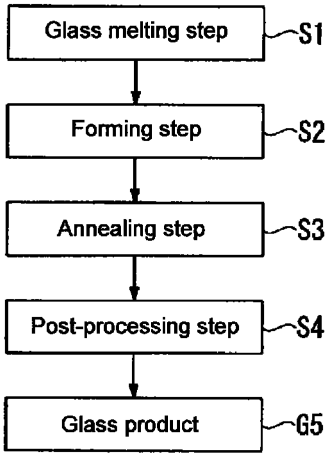
FIG. 1 is a flow chart illustrating an example of the method for producing a glass product of the present invention.

In the present invention, "D50" representing an average particle size of granule particles is, in a case where the particles are less than 1 mm, a cumulative volume 50% median diameter in a particle size distribution curve measured by means of a laser diffraction scattering method and, in a case where the particles are at least 1 mm, a weight cumulative 50% median diameter. The laser diffraction scattering method may, for example, be JIS Z8825-1 (2001).

"D50" representing an average particle size of raw material powder particles to be used for the production of granules, is a cumulative volume 50% median diameter in a particle size distribution curve measured by means of a laser diffraction scattering method. The laser diffraction scattering method in this case may, for example, be JIS Z8825-1 (2001) or JIS R1629 (1997). Further, "D90" is a cumulative volume 90% particle size from the smaller particle size side in said particle size distribution curve. Further, even in the case of raw material powder particles, with respect to ones where D50 exceeds 1 mm, the average particle size is obtained by the above-mentioned cumulative weight.

In the present invention, an alkaline earth metal is meant for three types of elements i.e. calcium (Ca), strontium (Sr) and barium (Ba).

<Alkali-Free Glass>

The granules of the present invention are granules of a glass raw material mixture and ones to be used as raw material for alkali-free glass (hereinafter sometimes referred to simply as glass). When the granules of the present invention are heated and melted to let the glass raw material mixture constituting the granules undergo a vitrification reaction, molten glass is obtainable, and when the molten glass is cooled, solid glass is obtainable. Now, the composition of alkali-free glass to be produced from the granules of the present invention will be described first.

The glass in the present invention is oxide-type glass and is borosilicate glass which is composed mainly of silicon oxide and contains a boron component.

The components of the glass will be represented by oxides such as $SiO_2$, $B_2O_3$, $Al_2O_3$, MgO, CaO and SrO, and their contents will be represented by mol % as calculated as oxides.

Further, in the present invention, alkali-free glass is meant for glass wherein the content of alkali metal oxides is less than 1 mol % (i.e. may be 0 mol %).

In the present invention, the composition of granules is represented by the composition of solid glass obtained by solidifying molten glass produced by melting and vitrifying the granules.

The glass composition of glass obtained from the granules of the present invention is such that the content of $SiO_2$ is from 60 to 75 mol %, the content of $Al_2O_3$ is from 5 to 15 mol %, the content of $B_2O_3$ is from 1 to 9 mol %, the content of MgO is from 0 to 15 mol %, the content of CaO is from 0 to 20 mol %, the content of SrO is from 0 to 12 mol %, the content of BaO is from 0 to 21 mol %, and the total content of CaO, SrO and BaO is more than 0 mol %. The total content of CaO, SrO and BaO is preferably from 10 to 25 mol %. The glass obtained from the granules of the present invention contains substantially no alkali metal oxides (i.e. less than 1 mol %). The content of alkali metal oxides is preferably less than 0.1 mol %.

The glass composition of glass obtained from the granules of the present invention is preferably the following (A) when it contains no BaO and contains SrO, preferably the following (B) when it contains no BaO and no SrO, and preferably the following (C) when it contains BaO.

(A) The content of $SiO_2$ is from 60 to 75 mol %, the content of $Al_2O_3$ is from 5 to 15 mol %, the content of $B_2O_3$ is from 1 to 9 mol %, the content of MgO is from 0 to 15 mol %, the content of CaO is from 0 to 20 mol %, and the content of SrO is more than 0 mol % and at most 12 mol %.

(B) The content of $SiO_2$ is from 60 to 75 mol %, the content of $Al_2O_3$ is from 5 to 15 mol %, the content of $B_2O_3$ is from 1 to 9 mol %, the content of MgO is from 0 to 15 mol %, and the content of CaO is more than 0 mol % and at most 20 mol %.

(C) The content of $SiO_2$ is from 60 to 75 mol %, the content of $Al_2O_3$ is from 5 to 15 mol %, the content of $B_2O_3$ is from 1 to 9 mol %, the content of MgO is from 0 to 15 mol %, the content of CaO is from 0 to 20 mol %, the content of SrO is from 0 to 12 mol %, and the content of BaO is more than 0 mol % and at most 21 mol %.

In (A) to (C), the total content of MgO, SrO, CaO and BaO is more preferably from 10 to 25 mol %.

Now, each component of glass will be described.

[$SiO_2$]

$SiO_2$ is a network former of glass and an essential component. Its content is at most 75 mol %, preferably at most 73 mol %, more preferably at most 71 mol %, based on the total amount 100 mol % of the glass components, so that the viscosity of molten glass will not become too high. On the other hand, $SiO_2$ has high effects to increase the strain point of glass, to increase the acid resistance and to lower the density, and therefore, its content is at least 60 mol %, preferably at least 62 mol %, more preferably at least 64 mol %. That is, the amount of $SiO_2$ is usually from 60 mol % to 75 mol %, preferably from 62 mol % to 73 mol %, more preferably from 64 mol % to 71 mol %, based on the total amount 100 mol % of the glass components.

[$Al_2O_3$]

$Al_2O_3$ is a component having effects to suppress phase separation of glass, etc. and is contained in an amount of at least 5 mol %, based on the total amount 100 mol % of the glass components. Its content is preferably at least 7 mol %, more preferably at least 9 mol %. On the other hand, from the viewpoint of e.g. maintaining the acid resistance of glass, the content of $Al_2O_3$ is at most 15 mol %, preferably at most 14 mol %, more preferably at most 13 mol %. That is, the amount of $Al_2O_3$ is usually from 5 mol % to 15 mol %, preferably from 7 mol % to 14 mol %, more preferably from 9 mol % to 13 mol %, based on the total amount 100 mol % of the glass components.

[$B_2O_3$]

$B_2O_3$ is a component having effects to improve the melting reactivity of glass, to lower the density of glass, to improve the devitrification properties, to reduce the linear expansion coefficient, etc. The content of $B_2O_3$ is at least 1 mol %, preferably at least 2 mol %, more preferably at least 3 mol %. Further, as mentioned hereinafter, in the present invention, in a case where glass having a small $B_2O_3$ content is to be produced by utilizing the boron source in order to increase the strength of granules, the strength of the granules tends to be low. Also from this viewpoint, the $B_2O_3$ content in glass is at least 1 mol %, preferably at least 2 mol %, more preferably at least 3 mol %.

On the other hand, $B_2O_3$ tends to lower the strain point of glass or to lower the acid resistance. Therefore, the content of $B_2O_3$ is at most 9 mol %, preferably at most 8 mol %. That is, the content of $B_2O_3$ is preferably from 2 mol % to 9 mol %, more preferably from 3 mol % to 8 mol %, based on the total amount 100 mol % of the glass components.

[MgO]

MgO is a component to lower the viscosity of molten glass, and it is preferably contained in an amount of at least 1 mol % in a case where a float process is employed in a step of forming glass. Further, it is preferably contained also in a case where a float process is not employed, since it lowers the density of glass, does not excessively lower the strain point and improves also the melting reactivity. The content of MgO is more preferably at least 2 mol %, further preferably at least 3 mol %, based on the total amount 100 mol % of the glass components. On the other hand, from the viewpoint of avoiding phase separation of glass, increasing the acid resistance, etc., its content is at most 15 mol %, preferably at most 12 mol %, more preferably at most 10 mol %. That is, the content of MgO is preferably from 1 mol % to 15 mol %, more preferably from 2 mol % to 12 mol % and further preferably from 3 mol % to 10 mol %, based on the total amount 100 mol % of the glass components.

[Alkaline Earth Metal Oxides]

Alkaline earth metal oxides are preferably contained in an amount of from 5 to 20 mol % in total, based on the total amount 100 mol % of the glass components. It is more preferred that alkaline earth metal oxides are contained in an amount of at least 7 mol % in total. Further, it is preferred that MgO and alkaline earth metal oxides are contained in an amount of from 10 to 25 mol % in total. That is, the amount of alkaline earth metal oxides is preferably from 5 to 20 mol %, more preferably from 7 to 20 mol %, based on the total amount 100 mol % of the glass components.

[CaO]

CaO is a component to lower the viscosity of molten glass. In a case where CaO is contained, its content is preferably at least 1 mol %, more preferably at least 2 mol %, further preferably at least 3 mol %, based on the total amount 100 mol % of the glass components. On the other hand, from the viewpoint of avoiding a deterioration of the devitrification properties or an increase of the linear expansion coefficient, etc., its content is at most 20 mol %, preferably at most 15 mol %, more preferably at most 10 mol %, further preferably at most 8 mol %. That is, the content of CaO is preferably from 1 mol % to 20 mol %, more preferably from 2 mol % to 10 mol %, further preferably from 3 mol % to 8 mol %.

[SrO]

SrO is a component to lower the viscosity of molten glass and is a component which is preferably contained in order to improve the devitrification properties and the acid resistance of glass. In a case where SrO is contained, its content is preferably at least 0.5 mol %, more preferably at least 1 mol %, further preferably at least 2 mol %, based on the total amount 100 mol % of the glass components. However, from the viewpoint of avoiding a deterioration of the devitrification properties or an increase of the linear expansion coefficient, etc., its content is at most 12 mol %, preferably at most 10 mol %, more preferably at most 8 mol %, further preferably at most 7 mol %. That is, in a case where SrO is contained, its content is preferably from 0.5 mol % to 12 mol %, more preferably from 1 mol % to 10 mol %, further preferably from 2 mol % to 8 mol %.

[BaO]

BaO is a component to lower the viscosity of molten glass and is a component which is preferably contained in order to improve the devitrification properties and the acid resistance of glass. In a case where BaO is contained, its content is preferably at least 0.5 mol %, more preferably at least 1 mol %, further preferably at least 2 mol %, based on the total amount 100 mol % of the glass components. However, from the viewpoint of avoiding a deterioration of the devitrification properties or an increase of the linear expansion coefficient, etc., its content is at most 21 mol %, preferably at most 12 mol %, more preferably at most 8 mol %, further preferably at most 7 mol %. That is, in a case where BaO is contained, its content is preferably from 0.5 mol % to 21 mol %, more preferably from 1 mol % to 12 mol %, further preferably from 2 mol % to 8 mol %.

[Other Components]

Glass obtained from the granules of the present invention may contain other components in an amount of up to 5 mol % in total.

Glass obtained from the granules of the present invention may contain $Fe_2O_3$, CuO, etc. in order to adjust the color of glass, etc. Their content is usually at most 0.5 mol % in total.

Glass obtained from the granules of the present invention may further contain a clarifier component, etc. The clarifier component may, for example, be $SO_3$, Cl, F or the like.

<Granules>

The granules of the present invention are ones to be used for producing alkali-free glass having the above-described composition. Further, the granules of the present invention are ones to be produced via a granulation step. However, ones wherein the pulverization rate which will be described hereinafter in Examples, becomes 100%, shall not be included in granules, even if they are produced via a granulation step.

The granules may contain components which will not be components of the above-described glass composition (for example, components which will disappear by volatilization or which will disappear by decomposition and vaporization during the production of glass). Further, they may contain a component which will be a component of the above-described glass composition but a part of which will disappear during the production of glass. The compositional proportion of the component, of which a part will disappear, as calculated as an oxide in the granules, is made to be a value larger than the glass compositional proportion in solid glass, so that it becomes to be the glass compositional proportion in the solid glass to be obtained. The component, of which a part will disappear, is mainly boron oxide, and other metal oxide components in the above-described glass composition will not substantially disappear. Therefore, except for boron oxide, the composition as calculated as oxides in the granules of the present invention is made to be substantially the same as the glass composition to be obtained, as calculated as oxides. Boron oxide is incorporated in an amount larger by an amount corresponding to the volatile portion than the boron oxide content in the glass composition of glass to be obtained.

The granules of the present invention contain a silicon source, an aluminum source and a boron source which will become $SiO_2$, $Al_2O_3$ and $B_2O_3$ as the essential components of glass. Further, they contain at least one of a calcium source, a strontium source and a barium source, since at least one member among alkaline earth metal oxides is essential. In a case where glass containing MgO as an optional component is to be produced, a magnesium source is further contained. Further, in a case where glass containing the above-mentioned other components is to be produced, their raw material components are contained depending upon such other components. Here, raw material for each component of glass may be raw material containing two or more glass components. For example, as mentioned later, dolomite is a calcium source and a magnesium source.

In the granules of the present invention, at least a part of the alkaline earth metal source is an alkaline earth metal borate hydrate. For example, in a case where a strontium source is contained, at least a part of the strontium source is strontium borate hydrate, and whole of the strontium source may not be strontium borate hydrate. In a case where two or more alkaline earth metal sources are contained, at least one of the two or more sources may be a borate hydrate. For example, in a case where a calcium source and a strontium source are contained, only the strontium source may be strontium borate hydrate (provided that whole of the strontium source may not be the borate hydrate, as mentioned above), and the calcium source may not be calcium borate hydrate.

The above alkaline earth metal borate hydrate may be incorporated to the raw material powder for the production of granules. However, it is preferred that in the process for the production of granules, a boron source and an alkaline earth metal source are, at least partially, reacted to form an alkaline earth metal borate hydrate.

Hereinafter, calcium borate hydrate will be referred to as hydrate ($x^1$), strontium borate hydrate as hydrate ($x^2$) and barium borate hydrate as hydrate ($x^3$), and these three types of alkaline earth metal borate hydrates will be generally referred to as hydrates (x).

[Alkaline Earth Metal Borate Hydrates]

The granules of the present invention contain at least one type of hydrates (x) depending upon the composition of the above glass. Hydrate ($x^1$) may, for example, be $CaB_6O_{10}.4H_2O$, hydrate ($x^2$) may, for example, be $SrB_6O_{10}.5H_2O$ and hydrate ($x^3$) may, for example, be $BaB_2O_4.5H_2O$. These hydrates (x) are usually present in crystalline forms in the granules, and the presence and contents of the hydrates (x) can be confirmed by a powder X-ray diffraction method.

As described later, it is possible to obtain granules excellent in strength by reacting a boron source and alkaline earth metal sources at least partially in the process for the production of granules to form hydrates (x) and to bring the amount of the hydrates (x) in the granules to be at least a predetermined level.

[Powder X-Ray Diffraction Method]

With respect to a sample (granules to be measured) finely pulverized in an agate mortar, powder X-ray diffraction intensity is measured at intervals of 0.02 degree in a range of 2θ being from 5 to 40 degrees by using CuKα ray in accordance with JIS K0131 (1996). At that time, the height of a peak of quartz (100) is taken to be at least 20,000 counts. Based on the diffraction pattern obtained by the measurement, in a range of 2θ being from 19.85 to 21.71 degrees as the diffraction peak of quartz (100), at most a linear line connecting both ends of the X-ray diffraction spectrum (hereinafter sometimes referred to also as the XRD spectrum) is removed as background, and an integrated value of the number of counts in this range is taken as the diffraction peak area of quartz (100). When the obtained diffraction peak area of quartz (100) is taken as 1 (standard), relative values of diffraction peak areas of the following hydrates (x) are obtained.

In the same XRD spectrum as above, in a case where peaks of e.g. $CaB_2O_4.6H_2O$ (2θ of the peak position is in the vicinity of 11.31 degrees), $Ca_3B_{20}O_{33}.12H_2O$ (2θ of the peak position is in the vicinity of 11.61 degrees), $Ca_2B_{14}O_{23}.8H_2O$ (2θ of the peak position is in the vicinity of 12.28 degrees), $CaB_2O_4.5H_2O$ (2θ of the peak position is in the vicinity of 12.53 degrees), and $CaB_6O_{10}.4H_2O$ (2θ of the peak position is in the vicinity of 13.00 degrees), are observed, in a range of 2θ being from 11.11 to 13.49, at most a linear line connecting both ends of the XRD spectrum is removed as background, and an integrated value of the number of counts in this range is taken as the diffraction peak area of hydrate ($x^1$). And, a relative value of the diffraction peak area of the hydrate ($x^1$) is obtained, when the diffraction peak area of quartz (100) is taken as 1 (standard).

Likewise, in the same XRD spectrum as above, in a case where peaks of $SrB_6O_{10}.5H_2O$ (2θ of the peak position is in the vicinity of 11.92 degrees), and $SrB_8O_{13}.2H_2O$ (2θ of the peak position is in the vicinity of 12.08 degrees), are observed, in a range of 2θ being from 10.81 to 13.01, at most a linear line connecting both ends of the XRD spectrum is removed as background, and an integrated value of the number of counts in this range is taken as the diffraction peak area of hydrate ($x^2$). And, a relative value of the diffraction peak area of the hydrate ($x^2$) is obtained, when the diffraction peak area of quartz (100) is taken as 1 (standard).

Likewise, in the same XRD spectrum as above, in a case where a peak of hydrate ($x^3$) is observed, in a range of 2θ being from 10.91 to 13.27, the diffraction peak area of hydrate ($x^3$) is calculated, and a relative value of the diffraction peak area of the hydrate ($x^3$) is obtained, when the diffraction peak area of quartz (100) is taken as 1 (standard).

In the XRD spectrum of the above three types of hydrates (x), their respective 2θ ranges are overlapped with one another. Therefore, in a case where the granules of the present invention contain two or more types of hydrates (x), it is difficult to obtain the relative values of the diffraction peak areas of the individual hydrates. The above methods for obtaining the relative values of the diffraction peak areas for the hydrates ($x^1$), ($x^2$) and ($x^3$) are ones in a case where the granules contain only one type of them, respectively.

In a case where the granules of the present invention contain two or more types of hydrates (x), the total of the relative values of the diffraction peak areas of such hydrates (x) shall be deemed, when hydrate ($x^3$) is contained, to be the relative value of the diffraction peak area of hydrate ($x^3$) and, when hydrate ($x^3$) is not contained, to be the relative value of the diffraction peak area of hydrate ($x^2$).

That is, in a case where the granules contain hydrate ($x^1$) and hydrate ($x^3$), in a case where they contain hydrate ($x^2$) and hydrate ($x^3$) and in a case where they contain hydrate ($x^1$), hydrate ($x^2$) and hydrate ($x^3$), the relative value obtained by the above method for obtaining the relative value of the diffraction peak area of hydrate ($x^3$) is taken as the total of the relative values of the diffraction peak areas of hydrates (x). Further, in a case where the granules contain no hydrate ($x^3$) and contain hydrate ($x^1$) and hydrate ($x^2$), the relative value obtained by the above method for obtaining the relative value of the diffraction peak area of hydrate ($x^2$) is taken as the total of the relative values of the diffraction peak areas of hydrates (x).

In a case where the granules of the present invention contain only hydrate ($x^1$), the total of the relative values of the diffraction peak areas of hydrates (x) is at least 0.005, preferably at least 0.008, more preferably at least 0.01, further preferably at least 0.04. When the relative diffraction peak area is at least such a lower limit value, good strength of the granules is obtainable. The upper limit of the relative diffraction peak area is preferably obtained in a range where the content of CaO in the glass composition of glass obtained from the granules does not exceed 20 mol %.

In a case where the granules of the present invention contain no hydrate ($x^3$) and contain hydrate ($x^2$), i.e. in a case where they contain hydrate ($x^1$) and hydrate ($x^2$), or contain only hydrate ($x^2$), the total of the relative values of the diffraction peak areas of hydrates (x) is at least 0.005, preferably at least 0.008, more preferably at least 0.015. It is further preferably at least 0.03, particularly preferably at least 0.09. When the relative diffraction peak area is at least such a lower limit value, good strength of the granules is obtainable. The upper limit of the relative diffraction peak area is preferably obtained in a range where the total content of CaO and SrO in the glass composition of glass obtained from the granules does not exceed 20 mol %.

In a case where the granules of the present invention contain hydrate ($x^3$), i.e. in a case where they contain hydrate ($x^3$) and one or two types of other hydrates, or contain only hydrate ($x^3$), the total of the relative values of the diffraction peak areas of hydrates (x) is at least 0.005, preferably at least 0.02, more preferably at least 0.04, further preferably at least 0.11. When the relative diffraction peak area is at least such a lower limit value, good strength of the granules is obtainable. The upper limit of the relative diffraction peak area is preferably obtained in a range where the total content of CaO, SrO and BaO in the glass composition of glass obtained from the granules does not exceed 21 mol %.

Now, the reason as to why the diffraction peak area of quartz (100) is taken as 1 (standard), as mentioned above, will be described.

The main constituting component of alkali-free glass is $SiO_2$. The raw material for $SiO_2$ is silica sand (quartz). This raw material is usually water-insoluble. That is, granules for the production of alkali-free glass contain particles of water-insoluble raw material in a large amount. Therefore, also in the granulation step, granulation tends to be difficult merely by introducing water. That is, it is necessary to have silica sand taken into granules well in the granulation step. At the same time, it is necessary that the granules obtained by the granulation step have sufficient strength not to be broken on impact. On the other hand, the granules of the present invention for the production of alkali-free glass contain little or no organic binder. By the presence of hydrates (x) in the granules, the hydrates (x) play a role of a binder, whereby it is possible to obtain granules excellent in strength. In a case where hydrates (x) are formed in the granulation step, it is not possible to preliminarily measure the amount of hydrates (x) in the granules. Therefore, the amount of hydrates (x) in the granules is defined by using, as a standard, the main constituting component of the granules. Specifically, the amount of hydrates (x) is relatively defined by taking the diffraction peak area of quartz (100) to be 1 (standard).

[Particle Size of Granules]

The average particle size (D50) of the granules is not particularly limited, and it is preferably made to be a suitable size depending upon the method for producing molten glass by using the granules. Variation in the particle size of granules should better be small in order to improve uniformity of the glass composition in molten glass or in a glass product. The average particle size and the particle size distribution of the granules can be adjusted by the composition of the raw material powder or by the production conditions in the granulation step.

In a case where the granules are to be used in a method for melting them by a usual melting method other than the after-described in-flight melting method, the average particle size (D50) of the granules is preferably at least 1.0 mm, whereby it is readily possible to suppress formation of bubbles in molten glass. The upper limit of the average particle size (D50) may be within a range where the production and melting are possible. The granules of the present invention are excellent in strength and scarcely breakable, and thus, the particle size can be made large. However, if the particle size is too large, the melting efficiency lowers, and therefore, the average particle size (D50) is preferably at most 15 mm.

The granules of the present invention can be made to have high strength even in the case of large granules, and therefore, they are particularly suitable as granules to be used in a method for melting them by a usual melting method.

Whereas, in a case where the granules are to be melted by an in-flight melting method, the average particle size (D50) of the granules is preferably from 50 to 1,000 μm, more preferably from 50 to 800 μm. When the average particle size of the granules is at least 50 μm, scattering or the like of the granules or their molten particles into a flue is less likely to occur during the in-flight melting. Further, when the granules become molten glass particles in flight, the surface area per unit mass of the molten glass particles becomes relatively small, whereby volatilization of boron oxide from the surface of the molten glass particles in flight can be reduced, such being desirable. On the other hand, when the average particle size of the granules is at most 1,000 μm, at the time of melting the granules in an in-flight heating apparatus, vitrification sufficiently proceeds even into the interior of particles to form molten glass particles while the particles are in flight, such being desirable.

<Method for Producing Granules>

The granules of the present invention are produced by a method which comprises granulating a raw material powder containing a silicon source, an aluminum source, a boron source, a magnesium source and an alkaline earth metal source in the presence of water. As the case requires, it is preferred that the granulation is followed by heating and drying.

The composition of the raw material powder is adjusted so that it becomes the same as the composition of the granules to be obtained.

According to a finding by the present inventors, it is possible to obtain granules excellent in strength by formulating the raw material powder so that the boron source and the alkaline earth metal source will react to sufficiently form the above-mentioned hydrates (x) in the process for producing the granules. The larger the content of the hydrates (x) in the granules, the higher the strength of the granules tends to be. Therefore, in the production of the granules, it is characterized that as at least a part of the boron source, boron oxide or boric acid is used, and as at least a part of the alkaline earth metal source a carbonate of the alkaline earth metal is used.

[Silicon Source]

The silicon source is a powder of a compound which can become a $SiO_2$ component in the step of producing glass. As the silicon source, silica sand is preferably used.

As the granules of the present invention are excellent in strength, it is possible to use silica sand having a small size, which used to be difficult to use as glass raw material. When the particle size of silica sand in the granules is smaller, it is more readily possible to improve uniformity of the composition in molten glass or in a glass product.

For example, the cumulative volume 90% particle size (D90) of silica sand is preferably at most 100 μm, more preferably at most 50 μm. From the viewpoint of handling efficiency of the powder, D90 of silica sand is preferably at least 20 μm.

[Aluminum Source]

The aluminum source is a powder of a compound which can become an $Al_2O_3$ component in the step of producing glass. Aluminum oxide, aluminum hydroxide, etc. are preferably used. One of them may be used alone, or two or more of them may be used in combination. Like silica sand, aluminum oxide is raw material which is relatively insoluble as the melting point is high among usual glass raw materials. In a case where aluminum oxide is used as the aluminum source, its cumulative volume 90% particle size (D90) is preferably at most 100 μm. From the viewpoint of handling efficiency of the powder, D90 is preferably at least 20 μm.

[Boron Source]

The boron source is a powder of a compound which can become a $B_2O_3$ component in the step of producing glass. As the boron source, boric acid such as orthoboric acid ($H_3BO_3$), metaboric acid ($HBO_2$) or tetraboric acid ($H_2B_4O_7$); boron oxide ($B_2O_3$); colemanite (calcium borate); etc. may be mentioned. One of them may be used alone, or two or more of them may be used in combination. Orthoboric acid is preferred, since it is inexpensive and readily available.

Further, in order to let the above-mentioned hydrates (x) form during the granulation step, it is necessary that at least a part of the boron source is boric acid or boron oxide. It is considered that during the granulation step, at least a part of boron oxide becomes boric acid as reacted with water. Hereinafter, a boron source which is boric acid or boron oxide will be referred to as an active boron source.

In a case where boric acid is to be used, its average particle size (D50) is preferably at least 50 μm, more preferably at least 100 μm, from the viewpoint of storage stability of the raw material. It is preferably at most 1 mm in order to increase the uniformity of the granules. That is, in a case where boric acid is to be used, its average particle size (D50) is preferably from 50 μm to 1 mm, more preferably from 100 μm to 1 mm.

[Magnesium Source]

The magnesium source is a powder of a compound which can become a MgO component in the step of producing glass. As the magnesium source in the present invention, magnesium oxide (MgO), magnesium hydroxide ($Mg(OH)_2$) and magnesium carbonate ($MgCO_3$) may be mentioned. Further, dolomite which will be hereinafter mentioned as an alkaline earth metal source, and $MgCl_2$, $MgF_2$ and $MgSO_4$ which will be mentioned as clarifiers, are also compounds which can become a MgO component in the step of producing glass and thus are magnesium sources.

According to a finding by the present inventors, when a magnesium source selected from the group consisting of magnesium oxide (MgO), magnesium hydroxide ($Mg(OH)_2$) and magnesium carbonate ($MgCO_3$) is contained in the raw material powder, during the production of granules, the hydrates (x) tend to be hardly formed, and instead, a borate hydrate of Mg ($MgB_6O_{10}.7H_2O$) tends to be readily formed. These specific magnesium sources are considered to have a higher reactivity with an active boron source than an alkaline earth metal source.

In the reaction of the magnesium source (MgO, $Mg(OH)_2$, $MgCO_3$) and a boron source, 3 mol of an active boron source i.e. the molar amount as calculated as $B_2O_3$ is reacted with 1 mol of the magnesium source to form a borate hydrate of Mg ($MgB_6O_{10}.7H_2O$). Therefore, if in the raw material powder, an active boron source is contained sufficiently large in amount relative to the amount of three times the total molar amount of MgO, $Mg(OH)_2$ and $MgCO_3$, even if a part of the active boron source and the magnesium source are reacted in the raw material powder, the remaining active boron source and an alkaline earth metal source will be reacted to readily form the hydrates (x) which contribute to the strength, such being desirable.

If the difference between the amount of the active boron source and the amount of the magnesium source (MgO, $Mg(OH)_2$, $MgCO_3$) contained in the raw material powder, is represented by Z $\{Z=B_2O_3-3(MgO+Mg(OH)_2+MgCO_3)\}$ i.e. the value obtained by subtracting the three times the total molar amount of MgO, $Mg(OH)_2$ and $MgCO_3$ from the molar amount of the active boron source as calculated as $B_2O_3$, as the molar amounts being per 100 g of glass, when the value of Z (unit: mol) is larger, the content of an alkaline earth metal borate hydrate becomes higher and the strength of the granules becomes higher.

In the present invention, the value of Z is at least −0.07 mol, preferably at least −0.01 mol, particularly preferably at least 0.02 mol. The upper limit of Z is within a range where in the glass composition of the granules, the content of $B_2O_3$ and the content of MgO will not exceed the respective ranges in the present invention.

As the magnesium source in the present invention, it is preferred to add any one of dolomite, magnesium chloride, magnesium fluoride, magnesium sulfate and magnesium nitrate in order to make the above Z small and to increase the strength of the granules. These components are magnesium sources, but may serve as other component sources. Therefore, it is necessary to take a due care for their blend amounts.

In a case where magnesium oxide, magnesium hydroxide or magnesium carbonate is contained as the magnesium source, its particle size is preferably large from such a viewpoint that it is thereby readily possible to suppress the reaction of the magnesium source and the boron source.

In a case where $Mg(OH)_2$ is to be used, its average particle size (D50) is preferably at least 4 μm. In order to make the strength of granules high, at least 100 μm is more preferred. It is considered that the reaction with a boron source thereby tends to be slow, and an alkaline earth metal borate hydrate tends to be readily formed. The upper limit is preferably at most 1 mm from the viewpoint of uniformity of the granules. That is, in a case where $Mg(OH)_2$ is to be used, its average particle size (D50) is preferably from 4 μm to 1 mm, more preferably from 100 μm to 1 mm.

In a case where a water-soluble magnesium salt such as magnesium chloride or magnesium sulfate is to be used as a part of the magnesium source, it is more preferred that such a water-soluble magnesium salt is dissolved in water and added as a granulating solution. Using a granulating solution containing a magnesium component is effective to increase uniformity of the granules.

[Alkaline Earth Metal Source]

The alkaline earth metal source other than the above hydrates (x) is a powder of a compound which can become SrO, CaO or BaO in the step of producing glass. Further, in a case where hydrates (x) are to be formed during the granulation, the alkaline earth metal source is alkaline earth metal compounds, of which at least a part can become hydrates (x) by a reaction with an active boron source. Specific examples may be carbonates such as calcium carbonate ($CaCO_3$), strontium carbonate ($SrCO_3$), barium carbonate ($BaCO_3$), dolomite (ideal chemical composition: $CaMg(CO_3)_2$), etc., and oxides such as calcium oxide (CaO), strontium oxide (SrO), barium oxide (BaO), etc. One of them may be used alone, or two or more of them may be used in combination.

Among them, carbonates are preferred, since hydrates (x) may thereby be readily formed. That is, the alkaline earth metal source preferably contains one or more carbonates and more preferably consists solely of carbonates. Particularly preferably, it contains dolomite.

According to a finding by the present inventors, if an alkaline earth metal hydroxide is present in the raw material powder, hydrates (x) tend to be hardly formed. Therefore, the content of an alkaline earth metal hydroxide in the raw material powder should better be small. Specifically, the total content of alkaline earth metal hydroxides in the raw material powder is preferably at most 10 mass %, more preferably at most 5 mass %, most preferably zero.

The average particle size (D50) of the alkaline earth metal source is preferably at most 100 μm, more preferably at most 60 μm, in the case of water-insoluble raw material such as calcium carbonate, strontium carbonate, barium carbonate or dolomite. The reason is that when it is at most 100 μm, formation of hydrates (x) tends to be easy. Further, from the viewpoint of handling efficiency, it is preferably at least 10 μm. That is, the average particle size (D50) of the alkaline earth metal source is preferably from 10 μm to 100 μm, more preferably from 10 μm to 60 μm.

[Other Glass Raw Materials]

The granules may contain, as auxiliary raw materials, a clarifier, a colorant, a melting assistant, an opacifier, etc. As such auxiliary raw materials, known components may suitably used. It is preferred that the granules contain a clarifier among such auxiliary raw materials.

[Clarifier]

As the clarifier, a sulfate, chloride or fluoride may be contained. The content of clarifiers is from 1 to 4% in total.

As the sulfate, chloride or fluoride, it is possible to use a compound containing a cation of an oxide constituting glass. Specifically it is possible to use a sulfate, chloride or fluoride of Mg or an alkaline earth metal. In its use, a sulfate, chloride or fluoride of Mg is deemed to be a magnesium source. A sulfate, chloride or fluoride of an alkaline earth metal is deemed to be an alkaline earth metal source.

The sulfate of Mg ($MgSO_4$), the chloride of Mg ($MgCl_2$) or the fluoride of Mg ($MgF_2$) presents no adverse effect to formation of hydrates (x). Therefore, when they are incorporated as auxiliary raw materials in granules, it is possible to reduce the content of a magnesium source selected from the group consisting of MgO, $Mg(OH)_2$ and $MgCO_3$, correspondingly.

In a case where a sulfate or the like is to be used as glass raw material, the magnesium salt has a problem in handling efficiency since it is hygroscopic and unstable. In the present invention, it is preferred that the magnesium salt is added in the form of an aqueous solution. By adding it in the form of an aqueous solution, it is possible to improve the uniformity of granules.

[Other Components]

The granules may contain a component other than glass raw materials. Such a component other than glass raw materials is a component of glass and may, for example, be the above-mentioned organic binder. As the organic binder, an organic binder such as a polyvinyl alcohol to be used for the production of usual granules, may be used, and its molecular weight is suitably from 10,000 to 300,000.

The granules of the present invention preferably contain no organic binder. However, if they contain an organic binder, its amount is preferably at most 1 mass %, more preferably at most 0.1 mass %, based on the granules.

Now, preferred glass materials and preferred contents thereof to be used for the production of granules will be further described.

[Silica Sand]

Silica sand is a silicon source which can become a $SiO_2$ component in the step of producing glass, and it is the main component of the raw material powder and is contained in an amount of from 48 to 52%.

As the granules of the present invention are excellent in strength, it is possible to use silica sand having a small size, which used to be difficult to use as glass raw material. When the particle size of silica sand in the granules is smaller, it is more readily possible to improve uniformity of the composition in molten glass or in a glass product.

For example, the cumulative volume 90% particle size (D90) of silica sand is preferably at most 100 μm, more preferably at most 50 μm. From the viewpoint of handling efficiency of the powder, D90 of silica sand is preferably at least 20 μm. That is, the cumulative volume 90% particle size (D90) of silica sand is preferably from 20 μm to 100 μm, more preferably from 20 μm to 50 μm.

[Aluminum Oxide]

Aluminum oxide is an aluminum source and is contained in an amount of from 13 to 17% in the raw material powder for granules. Like silica sand, aluminum oxide is raw material which is relatively insoluble as the melting point is high among usual glass raw materials. The cumulative volume 90% particle size (D90) of the aluminum oxide powder is preferably at most 100 μm. From the viewpoint of handling efficiency of the powder, D90 is preferably at least 20 μm.

[Boric Acid]

Boric acid is an inexpensive and readily available active boron source. Particularly, orthoboric acid is readily available and is a component which acts as a binder when dissolved in water in the granulation step, and when the total amount of the raw material powder is taken as 100%, it is contained in an amount of from 2 to 13% as calculated as orthoboric acid in the raw material powder. If the content of boric acid is less than 2%, the strength of granules is likely to be inadequate. The content of boric acid is preferably at least 4%, more preferably at least 8%, further preferably at least 10%. If it exceeds 13%, the chemical durability of solid glass is likely to be inadequate. That is, the content of boric acid is usually from 2 to 13%, preferably from 4 to 13%, more preferably from 8 to 13%, further preferably from 10 to 13%.

Further, in a case where any of MgO, $Mg(OH)_2$ and $MgCO_3$ is contained in the raw material powder, if the value obtained by subtracting the three times the total molar amount of MgO, $Mg(OH)_2$ and $MgCO_3$ from the molar amount of boric acid as calculated as $B_2O_3$ per 100 g of glass, is represented by Z $\{Z=B_2O_3-3(MgO+Mg(OH)_2+MgCO_3)\}$, when the value of Z (unit: mol) is larger, the content of an alkaline earth metal borate hydrate becomes higher and the strength of the granules becomes higher.

As mentioned above, the value of Z is at least −0.07 mol, preferably at least −0.01 mol, particularly preferably at least 0.02 mol.

The average particle size (D50) of boric acid powder is preferably at least 50 μm, more preferably at least 100 μm, from the viewpoint of storage stability of the raw material. It is preferably at most 1 mm in order to increase the uniformity of the granules. That is, the average particle size (D50) of boric acid powder is preferably from 50 μm to 1 mm, more preferably from 100 μm to 1 mm.

[Dolomite]

Dolomite is a carbonate having a composition of $CaMg(CO_3)_2$ and is an alkaline earth metal source as well as a magnesium source, and it is contained in an amount of from 3 to 12% in the raw material powder for granules, when the total amount of the raw material for granules is taken as 100%.

By incorporating dolomite, it is possible to reduce the amount of MgO, $Mg(OH)_2$ and $MgCO_3$ to be used, to increase the value of Z and to increase the strength of the granules. The content of dolomite is preferably at least 6%, more preferably at least 8%. That is, the content of dolomite is usually from 3 to 12%, preferably from 6 to 12%, more preferably from 8 to 12%.

The average particle size (D50) of dolomite is preferably at most 100 μm, more preferably at most 60 μm. The reason is that when it is at most 100 μm, formation of an alkaline earth metal borate hydrate becomes easy. Further, from the viewpoint of handling efficiency, it is preferably at least 10 μm. That is, the average particle size (D50) of dolomite is preferably from 10 μm to 100 μm, more preferably from 10 μm to 60 μm.

[Alkaline Earth Metal Carbonates]

Calcium carbonate, strontium carbonate and barium carbonate are all alkaline earth metal sources and raw materials to form the above-mentioned hydrates (x) when reacted with boric acid during the granulation. In the raw material powder, at least one member selected from the group consisting of calcium carbonate, strontium carbonate and barium carbonate is contained. When the total amount of the raw material powder is taken as 100%, their content in the raw material powder is from 7 to 36% in total. The content is preferably at most 26%. In order to increase the stability of glass, it is more preferably at most 12%. It is more preferred that strontium carbonate is contained in an amount of at least 7%. That is, the total content of alkaline earth metal carbonates is usually from 7 to 36%, preferably from 7 to 26%, more preferably from 7 to 12% in the raw material powder, when the total amount of the raw material powder is taken as 100%.

The average particle size (D50) of an alkaline earth metal carbonate is preferably at most 100 μm, more preferably at most 60 μm. The reason is that when it is at most 100 μm, formation of hydrate (x) becomes easy. Further, from the viewpoint of handling efficiency, it is preferably at least 10 μm. That is, the average particle size (D50) of an alkaline earth metal carbonate is preferably from 10 μm to 100 μm, more preferably from 10 μm to 60 μm.

[Alkaline Earth Metal Hydroxides]

Calcium hydroxide, strontium hydroxide and barium hydroxide are all alkaline earth metal sources, but if these hydroxides are present in the raw material powder as mentioned above, the above-mentioned hydrates (x) tend to be hardly formed.

The total content of alkaline earth metal hydroxides in the raw material powder is preferably at most 10 mass %, more preferably at most 5 mass %, most preferably zero, when the total amount of the raw material powder is taken as 100 mass %.

[MgO, $Mg(OH)_2$, $MgCO_3$]

MgO, $Mg(OH)_2$ and $MgCO_3$ are magnesium sources. When the raw material powder contains at least one member selected from the group consisting of MgO, $Mg(OH)_2$ and $MgCO_3$, the content is at most 4%, preferably at most 3%. The content may be zero.

According to a finding by the present inventors, when a magnesium source selected from the group consisting of magnesium oxide (MgO), magnesium hydroxide ($Mg(OH)_2$) and magnesium carbonate ($MgCO_3$) is contained in the raw material powder, as mentioned above, during the production of granules, the hydrates (x) tend to be hardly formed, and instead, a borate hydrate of Mg ($MgB_6O_{10}.7H_2O$) tends to be readily formed. These specific magnesium sources are considered to have a higher reactivity with an active boron source than an alkaline earth metal source.

[Granulation Method]

In the granulation, a raw material powder adjusted to have the same composition as granules to be obtained, is granulated in the presence of water. The water to be supplied to the raw material powder may be an aqueous solution containing known additives, but should preferably contain little organic substances.

The reaction of an active boron source and an alkaline earth metal carbonate in the raw material powder is likely to scarcely take place at ordinary temperature. Therefore, it is necessary that the temperature is increased during or after the granulation to such an extent that they will react to form hydrate (x). For example, it is preferred that the active boron source and the alkaline earth metal carbonate receive a heat history at a temperature of at least 40° C. for at least 5 minutes in such a state that they are in contact with each other. If necessary, it is preferred to positively heat them to accelerate the reaction. Usually, in the production of granules, it is common to heat particles during or after the granulation to remove excessive moisture in the particles, i.e. to dry the granules. Therefore, in the production of granules in the present invention, the above reaction is accelerated at the time of heating and drying the granules, whereby it is possible to obtain granules excellent in strength.

The granulation can be carried out by means of a known granulation method. For example, a tumbling granulation method or a spray drying granulation method may suitably employed. For example, a tumbling granulation method is preferred from such a viewpoint that granules having a relatively large particle size can thereby easily be produced.

[Tumbling Granulation Method]

As a tumbling granulation method, preferred is, for example, a method wherein a raw material powder is put into a container of a tumbling granulation apparatus, and the interior of the container is subjected to vibration and/or rotation so that while mixing, tumbling and stirring the raw material powder, a predetermined amount of water is sprayed to the raw material powder to carry out granulation.

As the container of the tumbling granulation apparatus, a rotational container of a dish-form, cylindrical-form or conical-form, or a vibration type container may, for example, be used without any particular restriction.

The tumbling granulation apparatus is not particularly limited. For example, it is possible to use one comprising a container rotational with its rotational axis in a direction inclined to the vertical direction, and rotary vanes rotational in the container about the rotational axis in a direction opposite to the container. Specifically, such a tumbling granulation apparatus may, for example, be Eirich Intensive Mixer (tradename, manufactured by Eirich).

If the amount of water to be used is too much, a long time is required for drying, and if it is too small, the strength of granules tends to be inadequate. Therefore, it is desired to set the amount of water not to cause such drawbacks. For example, it is preferred to carry out the granulation by supplying water in an amount of from 10 to 20 parts by mass per 100 parts by mass of the total amount of the raw material powder.

The particle size of granules can be controlled by the stirring intensity and the stirring time.

After the granulation by the tumbling granulation apparatus, the obtained particles are preferably heated and dried. A known heating and drying method may be used for this purpose. For example, it is possible to employ a method of heating the particles at a temperature of from 100° C. to 120° C. for from 1 hour to 12 hours, by means of a hot air drier.

[Spray Drying Granulation Method]

A spray drying granulation method may be carried out by a know method. For example, by means of a stirring apparatus such as a ball mill, water is supplied to a raw material powder to prepare a slurry, and the slurry is sprayed e.g. into a high temperature atmosphere at a level of from 200 to 500° C. by means of a spraying means such as a spray drier for drying and solidifying it to obtain granules.

The obtained granules may be sieved, as the case requires.

The water content in the granules after the heating and drying or in the granules obtained by the spray drying granulation method is preferably at most 2 mass %, more preferably at most 1 mass %, further preferably at most 0.3 mass %. If the water content of the granules exceeds 2 mass %, a large amount of water has to be volatilized in the melting step, whereby the thermal efficiency tends to deteriorate.

Here, the water content in the granules in the present invention can be obtained by the weight reduction rate between before and after maintaining the granules at 120° C. for 1 hour.

<Method for Producing Molten Glass>

The method for producing molten glass of the present invention is characterized by heating the granules of the present invention to form molten glass. The melting may be carried out by means of a usual melting method employing a Siemens type glass melting furnace or by means of an in-flight melting method. Either method may be carried out by a known method.

[Usual Melting Method]

A usual melting method is a method wherein, in a case where molten glass already melted is present in a glass melting furnace, granules are supplied onto its liquid surface to form a gob (also called a batch pile) of granules, which is heated by e.g. a burner to let melting proceed from the surface of the gob to gradually form molten glass.

In a case where a large amount of glass is to be produced by means of a large scale apparatus, it is common that a raw material batch and cullet obtained by pulverizing glass plates, are mixed and introduced. As the granules of the present invention is excellent in strength, they are scarcely breakable even when the raw material batch composed of the granules of the present invention and the cullet are mixed and introduced, such being desirable. The glass composition of the cullet is preferably the glass composition of glass obtainable from the granules of the present invention. Specifically, it is preferred to use cullet of a glass product obtained by using the granules of the present invention, or cullet formed in a step for producing such a glass product.

[In-Flight Melting Method]

An in-flight melting method is characterized by melting granules in a gas phase atmosphere to form molten glass particles and collecting the molten glass particles to form molten glass.

Specifically, firstly, granules are introduced into a high temperature gas phase atmosphere of an in-flight heating apparatus and melted and vitrified in the gas phase atmosphere to form molten glass particles. As the in-flight heating apparatus, a known apparatus may be used. The granules of the present invention is excellent in strength, whereby even if collision of particles one another or particles to e.g. an inner wall of the transport path may occur during the transportation or introduction, formation of fine powder can be avoided.

Then, the molten glass particles in the in-flight heating apparatus are collected to obtain glass melt, and molten glass taken out from the glass melt will be supplied to the next forming step. The method for collecting the molten glass particles may, for example, be a method wherein the molten glass particles falling in the gas phase atmosphere by their own weight, are received and collected in a heat resistant container provided at a lower portion in the gas phase atmosphere.

<Method for Producing Glass Product>

The method for producing a glass product of the present invention is a method which comprises forming the molten glass obtained by the method for producing molten glass of the present invention, followed by annealing to produce a glass product.

FIG. 1 is a flow chart illustrating an example of the method for producing a glass product of the present invention. Symbol S1 represents a glass melting step, which corresponds to a glass melting step in the method for producing molten glass of the present invention.

Firstly, the molten glass obtained in the glass melting step S1 is formed into a desired shape in a forming step S2, and then annealed in an annealing step S3. Thereafter, as the case requires, post processing such as cutting or polishing is applied by a known method in a post processing step S4 to obtain a glass product G5.

The forming step can be carried out by a known method such as a float process, a downdraw process or a fusion process. The float process is a process wherein molten glass is formed into a plate-form on molten tin. When the granules of the present invention are subjected to a usual melting method, a glass product having a particularly small water content (β-OH) is obtainable, whereby the float process is particularly preferred, since a defect is less likely to be formed at the glass surface in contact with molten tin. The annealing step S3 may also be carried out by a known method.

By using the granules of the present invention in the production of molten glass or in the production a glass product, it is possible to prevent scattering of the raw material powder, while overcoming the problem of coloration of glass due to an organic binder. Further, the strength of the granules is excellent, whereby it is possible to suppress formation of fine powder and to obtain molten glass or a glass product having good uniformity of the composition.

EXAMPLES

Now, the present invention will be described in further detail with reference to Examples, but it should be understood that the present invention is by no means limited to these Examples.

Production Examples 1 to 14

Examples for Production of Granules

[Glass Compositions]

Glass compositions used were 11 types of G1 to G11 as shown in Table 1. The unit is mol %.

TABLE 1

| | Glass composition | | | | | | | | | | |
|---|---|---|---|---|---|---|---|---|---|---|---|
| | G1 | G2 | G3 | G4 | G5 | G6 | G7 | G8 | G9 | G10 | G11 |
| $SiO_2$ | 64.6 | 65.2 | 65.5 | 65.7 | 65.7 | 65.8 | 62.1 | 61.0 | 60.2 | 66.8 | 68.7 |
| $Al_2O_3$ | 11.0 | 11.1 | 11.2 | 11.2 | 11.2 | 11.2 | 10.6 | 10.4 | 10.3 | 7.9 | 8.1 |
| $B_2O_3$ | 7.7 | 3.9 | 2.0 | 1.0 | 0.5 | 0.0 | 7.4 | 3.7 | 0.9 | 5.2 | 0.0 |
| MgO | 5.2 | 4.9 | 4.7 | 4.6 | 4.6 | 4.5 | 5.0 | 4.5 | 4.2 | 0.0 | 0.0 |
| CaO | 4.6 | 4.7 | 4.7 | 4.7 | 4.7 | 4.7 | 12.8 | 18.4 | 22.4 | 0.0 | 0.0 |
| SrO | 4.7 | 8.1 | 9.8 | 10.7 | 11.2 | 11.6 | 0.0 | 0.0 | 0.0 | 0.0 | 0.0 |
| BaO | 0.0 | 0.0 | 0.0 | 0.0 | 0.0 | 0.0 | 0.0 | 0.0 | 0.0 | 20.1 | 23.2 |
| $Fe_2O_3$ | 0.0 | 0.0 | 0.0 | 0.0 | 0.0 | 0.0 | 0.0 | 0.0 | 0.0 | 0.1 | 0.1 |
| Cl | 1.8 | 1.8 | 1.9 | 1.9 | 1.9 | 1.9 | 1.8 | 1.7 | 1.7 | 0.0 | 0.0 |
| $SO_3$ | 0.3 | 0.3 | 0.3 | 0.3 | 0.3 | 0.3 | 0.2 | 0.2 | 0.2 | 0.0 | 0.0 |

Formulation Examples

Formulations used were 16 types as shown in Tables 2 and 3. The unit is mass %.

Magnesium chloride used as raw material was hexahydrate; strontium chloride was hexahydrate; magnesium sulfate was heptahydrate; and calcium sulfate was dihydrate.

D50 and D90 of silica sand, D90 of aluminum oxide and D50 of other raw material powders were as follows:

D50 of silica sand: 26 μm, D90: 45 μm,
D90 of aluminum oxide: 90 μm,
D50 of boric acid: 300 μm,
D50 of dolomite: 45 μm,
D50 of magnesium hydroxide: 5 μm,
D50 of magnesium chloride: 3,000 μm,
D50 of magnesium carbonate: 10 μm,
D50 of barium carbonate: 50 μm,
D50 of magnesium sulfate: 1,000 μm,
D50 of strontium hydroxide: 400 μm,
D50 of strontium chloride: 400 μm,
D50 of strontium carbonate: 60 μm,
D50 of calcium hydroxide: 10 μm,
D50 of calcium carbonate: 50 μm,
D50 of calcium sulfate: 250 μm,
D50 of iron oxide: 90 μm.

TABLE 2

| | Formulation Example No. | | | | | | | |
|---|---|---|---|---|---|---|---|---|
| | G1-1 | G1-2 | G2-1 | G3-1 | G4-1 | G5-1 | G6-1 | G7-1 |
| Glass composition | G1 | G1 | G2 | G3 | G4 | G5 | G6 | G7 |
| Silica sand | 50.7 | 50.3 | 50.3 | 50.3 | 50.3 | 50.3 | 50.3 | 49.2 |
| Aluminum oxide | 14.7 | 14.6 | 14.6 | 14.6 | 14.6 | 14.6 | 14.6 | 14.2 |
| Boric acid | 12.5 | 12.4 | 6.2 | 3.1 | 1.6 | 0.8 | | 12.1 |
| Dolomite | 8.8 | 9.3 | 9.3 | 9.2 | 9.2 | 9.2 | 9.2 | 9.1 |
| Magnesium hydroxide | 1.6 | 0.5 | 0.3 | 0.1 | 0.1 | | | 0.5 |
| Strontium carbonate | 7.6 | 9.4 | 15.9 | 19.1 | 20.8 | 21.6 | 22.5 | |
| Strontium chloride | 3.2 | | | | | | | |
| Calcium carbonate | 0.4 | 0.4 | 0.4 | 0.4 | 0.4 | 0.4 | 0.4 | 11.4 |
| Magnesium chloride | | 2.4 | 2.4 | 2.5 | 2.5 | 2.5 | 2.5 | 2.5 |
| Magnesium sulfate | | 0.7 | 0.7 | 0.7 | 0.7 | 0.7 | 0.7 | 0.7 |
| Calcium sulfate | 0.5 | | | | | | | |

TABLE 3

| | Formulation Example No. | | | | | | | |
|---|---|---|---|---|---|---|---|---|
| | G8-1 | G9-1 | G1-3 | G1-4 | G1-5 | G1-6 | G10-1 | G11-1 |
| Glass composition | G8 | G9 | G1 | G1 | G1 | G1 | G10 | G11 |
| Silica sand | 48.4 | 47.8 | 50.3 | 50.4 | 51.7 | 47.0 | 42.5 | 43.4 |
| Aluminum oxide | 14.0 | 13.8 | 14.6 | 14.6 | 14.9 | 13.6 | 8.5 | 8.6 |
| Boric acid | 6.0 | 1.5 | 12.4 | 12.4 | 12.7 | 11.6 | 6.8 | 0.0 |
| Dolomite | 8.9 | 8.8 | 3.7 | | | 8.8 | | |
| Magnesium hydroxide | 0.3 | 0.1 | 0.5 | 0.5 | 3.2 | 0.5 | | |
| Magnesium carbonate | | | 2.2 | 3.6 | | | | |
| Calcium carbonate | 19.5 | 25.1 | 3.7 | 5.9 | 0.4 | 0.3 | | |
| Calcium hydroxide | | | | | 4.3 | | | |
| Strontium carbonate | | | 9.3 | 9.3 | 9.6 | | | |
| Strontium hydroxide | | | | | | 15.2 | | |
| Magnesium chloride | 2.4 | 2.3 | 2.4 | 2.4 | 2.5 | 2.2 | | |
| Magnesium sulfate | 0.7 | 0.6 | 0.7 | 0.7 | 0.8 | 0.8 | | |
| Barium carbonate | | | | | | | 42.1 | 47.9 |
| Iron oxide | | | | | | | 0.1 | 0.1 |

[Production of Granules]

Using raw material powders in Formulation Examples shown in Tables 2 and 3, granules having D50 of about 2 mm were produced. Correspondence of the respective Production Example Nos., Formulation Example Nos. and Glass compositions is as shown in Tables 4 and 5. As a granulation method, the following tumbling granulation method was employed.

As a granulation apparatus, the following Eirich Intensive Mixer (tradename, manufactured by Nippon Eirich Co., Ltd.) was used.

Main body: Type R02, Capacity: 5 L

Rotor: ϕ125 mm, star-type

Firstly, 3.0 kg of a raw material powder was put into the granulation apparatus and mixed under conditions being a pan rotation speed of 42 rpm, a rotor rotation speed of 900 rpm and a mixing time of 30 seconds (mixing step).

Then, the rotor was stopped, and while rotating only the pan, 490 g of water was put. Then, the rotor rotational speed was raised to 3,000 rpm, and granulation was carried out for 18 minutes (granulation step).

Then, the rotor rotation speed was lowered to 900 rpm, and particle size regulation was carried out for 1 minute (particle size regulation step).

The obtained granules were put in a stainless steel container and heated and dried under a condition of 80° C. for 12 minutes in a hot air drier to obtain granules (heating and drying step).

[Value of $Z=B_2O_3-3(MgO+Mg(OH)_2+MgCO_3)$]

In each Production Example, with respect to the boron source and the magnesium source in the raw material powder, the molar amount of each component as calculated as an oxide per 100 g of glass was obtained, and the value of Z (unit: mol) obtainable by $B_2O_3-3(MgO+Mg(OH)_2+MgCO_3)$ was obtained.

[Measurement of Relative Diffraction Peak Areas]

Figure 2:
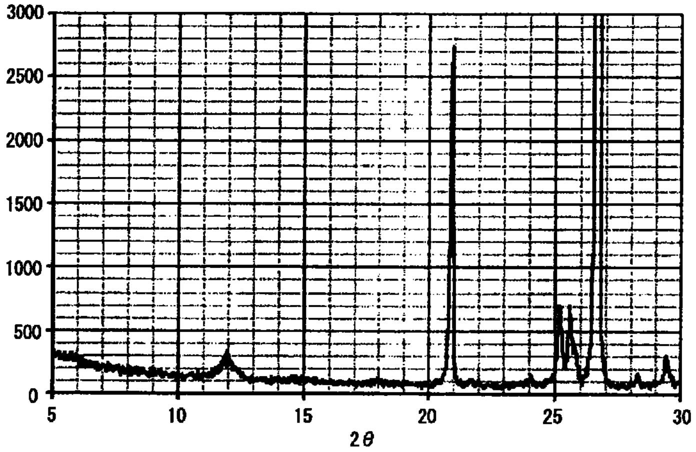
FIG. 2 is an XRD spectrum measured in a Production Example for granules.
Figure 3:
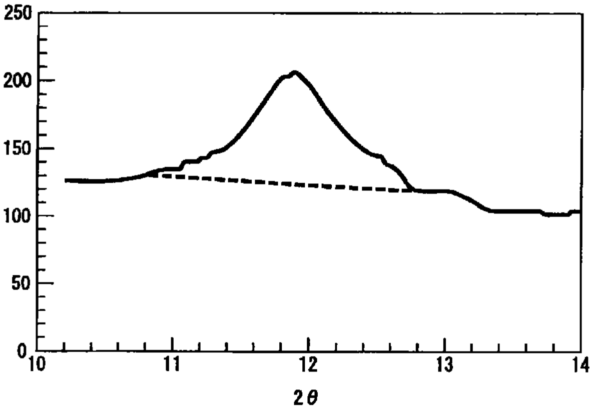
FIG. 3 is a graph showing an XRD peak measured in a Production Example for granules and its background.
Figure 4:
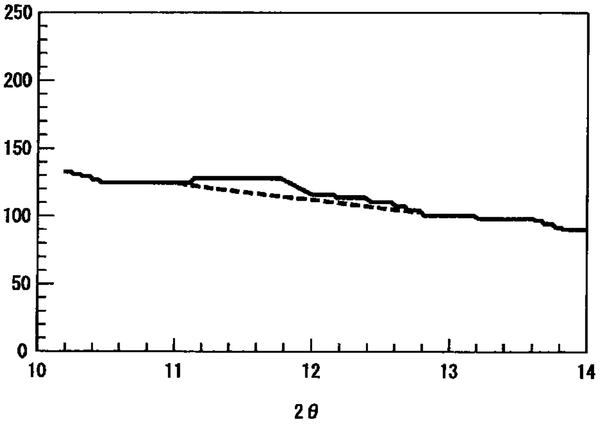
FIG. 4 is a graph showing an XRD peak measured in a Production Example for granules and its background.
Figure 5:
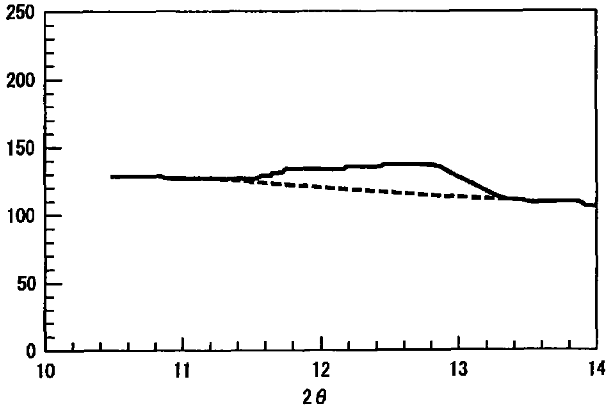
FIG. 5 is a graph showing an XRD peak measured in a Production Example for granules and its background.
Figure 6:
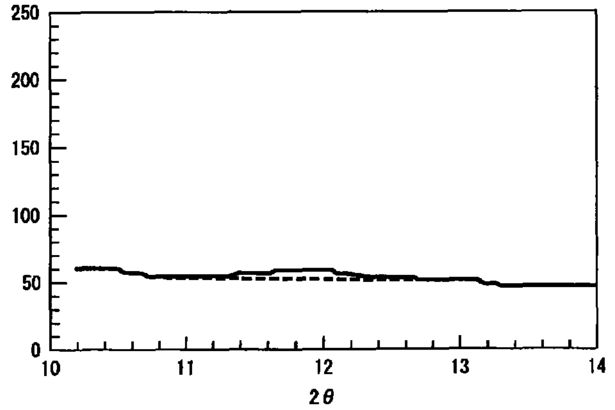
FIG. 6 is a graph showing an XRD peak measured in a Production Example for granules and its background.
Figure 10:
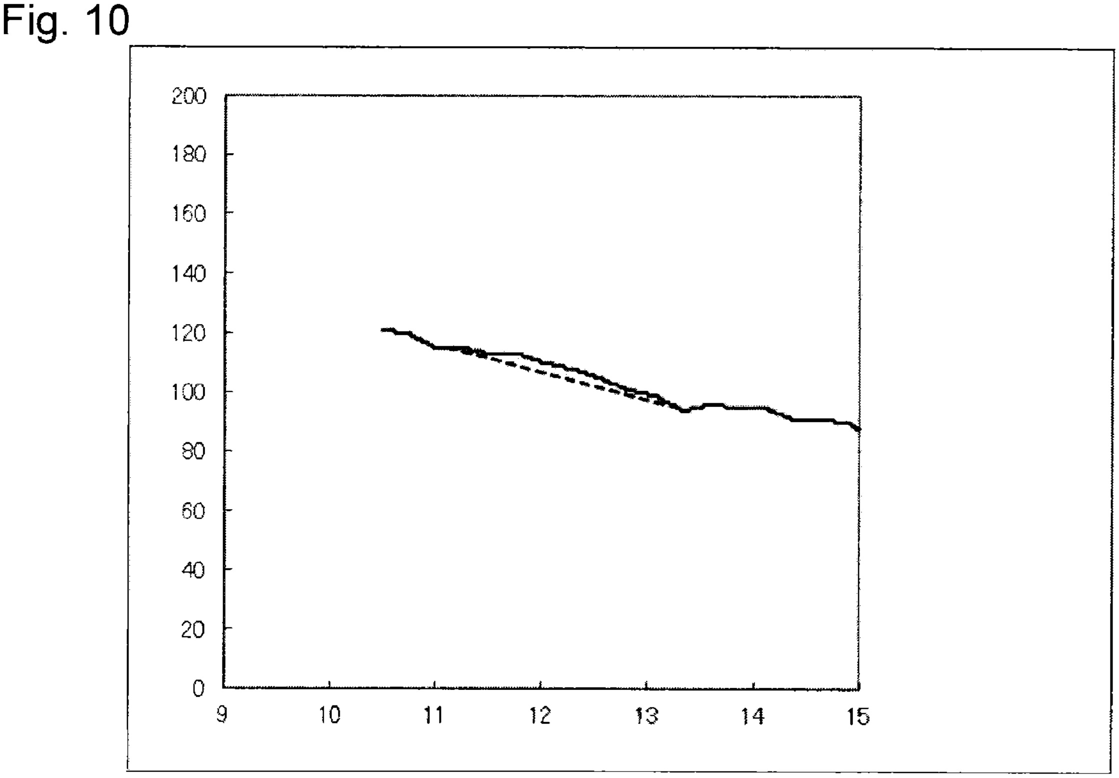
FIG. 10 is a graph showing an XRD peak measured in a Production Example for granules and its background.

With respect to a sample prepared by finely pulverizing granules obtained in each Production Example in an agate mortar, an analysis by a powder X-ray diffraction method was carried out by means of automatic X-ray diffraction apparatus (tradename: RINT2500, manufactured by Rigaku Corporation) at intervals of 0.02 degree in a range of 2θ being from 5 to 40 degrees by using CuKα ray. Examples of obtained XRD spectra are shown in FIGS. 2 to 6. FIG. 2 shows the XRD spectrum in Production Example 2. FIGS. 3 to 6 show the XRD spectra in Production Examples 1, 4, 8 and 12, respectively. Further, FIG. 10 shows the XRD spectrum in Production Example 15. In each XRD spectrum, the spectrum in the vicinity of the alkaline earth borate peak is shown by a solid line, and the background is shown by a dotted line. In each XRD spectrum, the ordinate represents the number of counts (no unit), and the abscissa represents 2θ.

By the above powder X-ray diffraction method, the relative diffraction peak areas of hydrate ($x^1$) [calcium borate hydrate], hydrate ($x^2$) [strontium borate hydrate] and hydrate ($x^3$) [barium borate hydrate] were measured, respectively. The results are shown in Tables 4 and 5.

[Measurement of Pulverization Rate and Evaluation of Strength of Granules (Cullet Mixing/Pulverization Test)]

50 g of alkali-free glass cullet having a thickness of about 1 mm and a size of about 20 mm×20 mm and 50 g of granules were put into a 250 ml plastic container and shaken up 200 times, and then, the weight (Y) of particles passed through a sieve with an opening of about 200 μm was measured, whereupon the proportion of Y based on the weight (50 g) of the original granules was taken as the pulverization rate (unit:%). The smaller this value, the higher the strength of the granules.

The strength of granules was evaluated based on the value of the pulverization rate. A case where the value of the pulverization rate is less than 10% was rated as "A" (excellent), a case where it is at least 10% and less than 30% was rated as "B" (good), a case where it is at least 30% and less than 55% was rated as "C" (acceptable), and a case where it is at least 55% was rated as "D" (unacceptable). The strength of granules is preferably A, B or C.

These results are shown in Tables 4 and 5. In Production Examples 7 and 14, the pulverization rate was 100%, and no granules were formed, and therefore, the strength of granules was indicated by "-".

TABLE 4

| Production Example No. | Ex. 1 | Ex. 2 | Ex. 3 | Ex. 4 | Ex. 5 | Ex. 6 | Ex. 7 |
|---|---|---|---|---|---|---|---|
| Formulation Example No. | G1-1 | G1-2 | G2-1 | G3-1 | G4-1 | G5-1 | G6-1 |
| Glass composition | G1 | G1 | G2 | G3 | G4 | G5 | G6 |
| Value of Z (mol) | 0.0249 | 0.0859 | 0.0426 | 0.0212 | 0.0106 | 0.0053 | 0.00 |
| Relative diffraction peak area of hydrate ($x^2$) | 0.097 | 0.1554 | 0.034 | 0.023 | 0.010 | 0.000 | 0.000 |
| Pulverization rate (%) | 8 | 4 | 9 | 15 | 33 | 56 | 100 |
| Strength of granules | A | A | A | B | C | D | — |

TABLE 5

| Production Example No. | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Formulation Example No. | G7-1 | G8-1 | G9-1 | G1-3 | G1-4 | G1-5 | G1-6 | G10-1 | G11-1 |
| Glass composition | G7 | G8 | G9 | G1 | G1 | G1 | G1 | G10 | G11 |
| Value of Z (mol) | 0.0859 | 0.0426 | 0.0106 | −0.0048 | −0.0653 | −0.0232 | 0.0878 | 0.065 | 0.000 |
| Relative diffraction peak area of hydrate ($x^1$) | 0.047 | 0.008 | 0.000 | — | — | — | — | — | — |
| Relative diffraction peak area of hydrate ($x^2$) | — | — | — | 0.019 | 0.012 | 0.008 | 0.000 | — | — |
| Relative diffraction peak area of hydrate ($x^3$) | — | — | — | — | — | — | — | 0.047 | 0.000 |
| Pulverization rate (%) | 7 | 9 | 85 | 27 | 40 | 54 | 100 | 6 | 70 |
| Strength of granules | A | A | D | B | C | C | — | A | D |

As shown in Tables 4 and 5, good strength of granules was obtained in Production Examples 1 to 5, 8, 9, 11 to 13 and 15. Particularly in Production Examples 1 to 3, 8, 9 and 15, the strength of granules was excellent.

In Production Examples 5, 12 and 13, the strength of granules was relatively low.

In Production Example 6, the content of $B_2O_3$ in glass composition (G5) was small, and in Production Example 7, glass composition (G6) did not contain boric acid, and in Production Example 16, glass composition (G11) did not contain boric acid. Therefore, the value of the relative diffraction peak area of hydrate ($x^2$) [strontium borate hydrate] was zero, and good strength of granules was not obtained. Further, in Production Examples 6 and 7, the value of the relative diffraction peak area of hydrate ($x^1$) [calcium borate hydrate] was also zero, and in Production Example 16, the relative diffraction peak area of hydrate ($x^3$) [barium borate hydrate] was also zero.

Production Examples 8 to 10 are examples in which the glass composition contains neither SrO nor BaO. In Production Example 10, in glass composition (G9), the content of calcium carbonate was large, but the content of $B_2O_3$ was small. Therefore, the value of the relative diffraction peak area of hydrate (x1) [calcium borate hydrate] was zero, and good strength of granules was not obtained.

In Production Examples 12 and 13, glass composition (G1) was the same as in Production Examples 1 and 2, but Production Example 12 is an example wherein no dolomite was used and instead calcium carbonate and magnesium carbonate were used, and Production Example 13 is an example wherein no dolomite was used and instead, calcium hydroxide and magnesium hydroxide were used. In each case, the value of the relative diffraction peak area of hydrate ($x^2$) [strontium borate hydrate] was relatively low, and the strength of granules was slightly inferior. The reason is considered to be such that in Production Example 12, the value of Z was particularly small, and in Production Example 13, calcium hydroxide was contained in a large amount particularly in the calcium source.

In Production Example 14, the value of the relative diffraction peak area of hydrate ($x^2$) [strontium borate hydrate] was zero, and no granules were formed. The reason is considered to be such that in Production Example 14, as the strontium source, strontium carbonate was not used, and instead, strontium hydroxide was used.

In Production Examples 6 and 10, no peak of either hydrate ($x^2$) [strontium borate hydrate] or hydrate ($x^1$) [calcium borate hydrate] was observed, but the pulverization rate was not 100%, and granules having inadequate strength were formed.

Further, in Production Example 16, no peak of hydrate (x3) [barium borate hydrate] was observed, but the pulverization rate was not 100%, and granules having inadequate strength were formed.

The reason is considered to be such that boric acid contained in the raw material powder acted as a weak binder.

When hydrate ($x^2$) [strontium borate hydrate] is formed in the step of producing granules, as the value of Z is larger, the content of hydrate ($x^2$) [strontium borate hydrate] in the granules tends to be large.

Production Examples 21 to 27

Examples for Production of Glass Gobs

Production Example 21

In Formulation Example No. G1-1 (Production Example 1), D50 of silica sand was changed to 57 μm, D90 thereof was changed to 91 μm, D50 of dolomite powder was changed to 264 μm, and D50 of strontium carbonate powder was changed to 513 μm. Otherwise, in the same manner as in Production Example 1, granules were produced, and molten glass and glass gob were produced by using the obtained granules.

Specifically, granules in such an amount that the mass after vitrification would be 250 g, were put in a platinum crucible having a diameter of about 80 mm and heated for 60 minutes in an electric furnace of 1,550° C. to melt the granules. Then, the molten glass was annealed to prepare glass gob.

Figure 7:
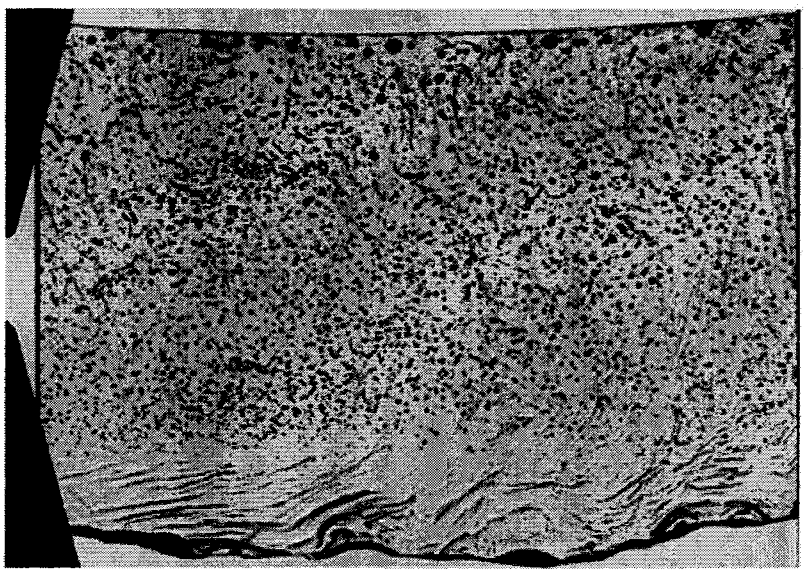
FIG. 7 is a photograph of a cut-out surface of a glass plate produced in a Production Example for glass gob.

Glass at an upper center of the crucible was hollowed out by a core drill to obtain cylindrical glass having a diameter of 40 mm and a height of 25 mm. A glass plate having a thickness of 1 mm and including the center axis of the cylindrical glass was cut out. Both cut-out surfaces were subjected to optical polishing processing (mirror polishing finish) to obtain a sample for evaluation. FIG. 7 is a photograph of a cut-out surface of the obtained glass plate.

With respect to the obtained sample for evaluation, the β-OH value as an index for the water content in glass and the $\Delta SiO_2$ value as an index for uniformity of glass composition, were measured by the following methods. The results are shown in Table 6.

(Method for Measuring β-OH Value)

The β-OH value (unit: $mm^{-1}$) of glass is a value obtained by measuring the absorbance to light with a wavelength of from 2.75 to 2.95 μm with respect to the sample for evaluation and dividing its maximum value $\beta_{max}$ by the thickness (mm) of the sample for evaluation. The smaller the β-OH value, the smaller the water content in glass.

(Method for Measuring $\Delta SiO_2$ Value)

With respect to a portion of the glass gob corresponding to from 0 to 3 mm from the top surface of glass in the crucible, of the sample for evaluation, the $SiO_2$ concentration (unit: mass %) was measured by a fluorescent X-ray analysis, and the measured value was identified as X1. With respect to a portion of the glass gob corresponding to from 22 to 25 mm from the top surface of glass in the crucible, the $SiO_2$ concentration (unit: mass %) was measured in the same manner, and the measured value was identified as X2. A value obtained by subtracting X2 from X1 (i.e. X1−X2) was taken as the $\Delta SiO_2$ value. The smaller the $\Delta SiO_2$ value, the higher the uniformity of glass composition.

Production Example 22

Figure 8:
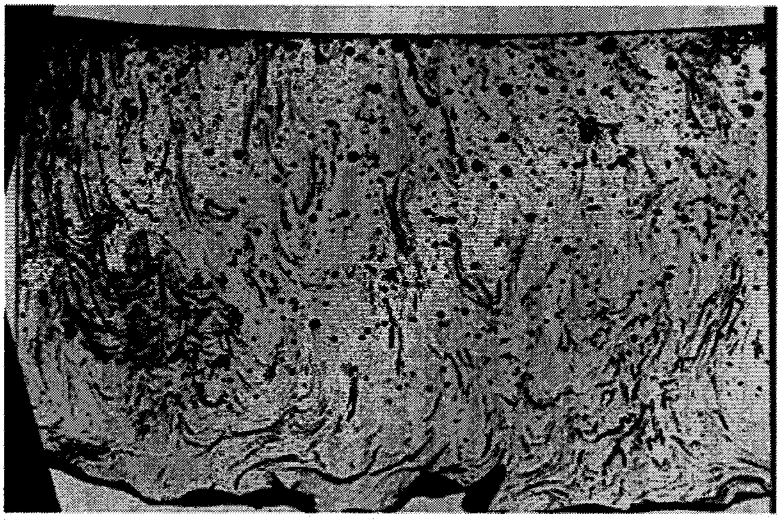
FIG. 8 is a photograph of a cut-out surface of a glass plate produced in a Production Example for glass gob.

Molten glass and glass gob were produced and evaluated in the same manner as in Production Example 21 except that in Production Example 21, the raw material powder was used without being granulated. The results are shown in Table 6. FIG. 8 is a photograph of a cut-out surface of the obtained glass plate.

Production Examples 23 to 26

Figure 9:
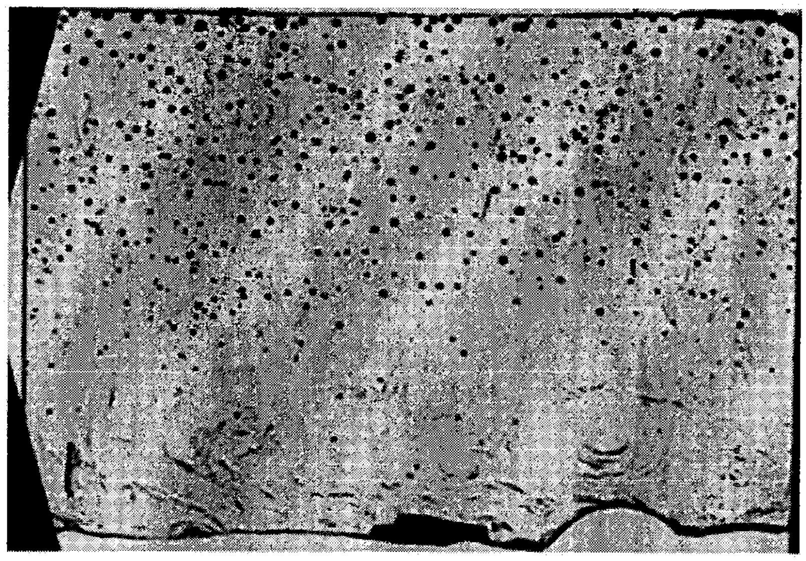
FIG. 9 is a photograph of a cut-out surface of a glass plate produced in a Production Example for glass gob.

Raw materials having Formulation Example Nos. as shown in Table 6 were used. However, D50 of silica sand was changed to 26 μm, D50 of dolomite powder was changed to 48 μm and D50 of strontium carbonate powder was changed to 62 μm. In Production Examples 23 to 26, molten glass and glass gob were produced and evaluated in the same manner as in Production Example 21 (granulated). The results are shown in Table 6. FIG. 9 is a photograph of a cut-out surface of the obtained glass plate.

Production Example 27

Molten glass and glass gob were produced and evaluated in the same manner as in Production Example 24 except that in Production Example 24, the raw material powder was used without being granulated. The results are shown in Table 6.

TABLE 6

| | Production Example No. | | | | | | |
|---|---|---|---|---|---|---|---|
| | Ex. 21 | Ex. 22 | Ex. 23 | Ex. 24 | Ex. 25 | Ex. 26 | Ex. 27 |
| Formulation Example No. | G1-1 | G1-1 | G1-1 | G1-2 | G1-4 | G1-6 | G1-2 |
| Glass composition | G1 | G1 | G1 | G1 | G1 | G1 | G1 |
| Granulation | Yes | No | Yes | Yes | Yes | Yes | No |
| β-OH | 0.1 | 0.27 | 0.16 | 0.18 | 0.17 | 0.28 | 0.34 |
| $\Delta SiO_2$ | 3.6 | 7.5 | 1.8 | 1.6 | 2.0 | 5.1 | 3.3 |

As shown by the results in Table 6, in Production Examples 21 and 23 to 25, the uniformity of glass compositions was excellent, and the water content was small.

From comparison of Production Examples 21 and 23, it is evident that even if the glass composition was the same, in Production Example 23 wherein the raw material powder such as silica sand was finer, $\Delta SiO_2$ was smaller, and the uniformity of the glass composition was more improved.

In Production Example 22 wherein no granulation was carried out, the uniformity of the glass composition was poor, and the water content was large, as compared with Production Example 21.

In Production Example 27 wherein no granulation was carried out, the uniformity of the glass composition was poor, and the water content was large, as compared with Production Example 24. Further, in Production Example 27, since the raw material was fine powder, scattering in the melting operation was substantial, and the working efficiency was poor.

In Production Example 26, the glass composition was G1, and nevertheless, the formulation was the same as in Production Example 14 wherein the value of the relative diffraction peak area of hydrate (x2) [strontium borate hydrate] was low, and no granules were formed. The β-OH value and the $\Delta SiO_2$ value were large.

INDUSTRIAL APPLICABILITY

The granules of the present invention contain little or no organic binder and are excellent in strength, and therefore, they are useful in a method for producing molten glass and in a method for producing a glass product.

This application is a continuation of PCT Application No. PCT/JP2012/063364, filed on May 24, 2012, which is based upon and claims the benefit of priority from Japanese Patent Application No. 2011-117147 filed on May 25, 2011. The contents of those applications are incorporated herein by reference in its entirety.

REFERENCE SYMBOLS

S1: Glass melting step
S2: Forming step
S3: Annealing step
S4: Post processing step
S5: Glass product

What is claimed is:

1. Granules of a glass raw material mixture, such that glass obtained from the granules is alkali-free glass having the following glass composition containing substantially no alkali metal oxides, Glass composition (represented by mol % based on oxides):
$SiO_2$: from 60 to 75 mol %,
$Al_2O_3$: from 5 to 15 mol %,
$B_2O_3$: from 1 to 9 mol %,
MgO: from 0 to 15 mol %,
CaO: from 0 to 20 mol %,
SrO: from 0 to 12 mol %,
BaO: from 0 to 21 mol %, provided that the total of CaO, SrO and BaO is more than 0 mol %;

the granules contain at least one member selected from the group consisting of strontium borate hydrate, calcium borate hydrate and barium borate hydrate; and in an X-ray diffraction spectrum of the granules obtained by means of a CuKα ray, when the diffraction peak area of quartz (100) in a range of 2θ being from 19.85 to 21.71 degrees is taken as 1, the total of the relative value of the diffraction peak area of strontium borate hydrate in a range of 2θ being from 10.81 to 13.01 degrees, the relative value of the diffraction peak area of calcium borate hydrate in a range of 2θ being from 11.11 to 13.49 degrees, and the relative value of the diffraction peak area of barium borate hydrate in a range of 2θ being from 10.91 to 13.27 degrees, is at least 0.005.

2. The granules according to claim 1, wherein in the glass composition, BaO is 0 mol %.

3. The granules according to claim 2, wherein in the glass composition, SrO is more than 0 mol %, and the total of the relative values of the diffraction peak areas is at least 0.03.

4. The granules according to claim 2, wherein in the glass composition, SrO is 0 mol % and CaO is more than 0%, and the relative value of the diffraction peak area is at least 0.008.

5. The granules according to claim 1, wherein in the glass composition, BaO is more than 0 mol %, and the total of the relative values of the diffraction peak areas is at least 0.02.

6. The granules according to claim 1, wherein D50 representing a cumulative weight median diameter in a particle size distribution curve of the granules is at least 1.0 mm.

7. A method for producing the granules as defined in claim 1, which comprises granulating a raw material powder containing a silicon source, an aluminum source, a boron source, a magnesium source and an alkaline earth metal source in the presence of water, wherein at least a part of the boron source is boron oxide or boric acid, and at least a part of the alkaline earth metal source is a carbonate of the alkaline earth metal.

8. The method according to claim 7, wherein the granulation is followed by heating and drying.

9. The method according to claim 7, wherein the raw material powder contains, as represented by mass percentage, from 48 to 52% of silica sand, from 2 to 13% of boric acid as calculated as orthoboric acid, from 13 to 17% of aluminum oxide, from 3 to 12% of dolomite, and from 7 to 36% in total of at least one alkaline earth metal carbonate, and in a case where a magnesium source is contained, the total content of MgO, $Mg(OH)_2$ and $MgCO_3$ is from 0 to 4%.

10. The method according to claim 7, wherein the raw material powder contains at least one member selected from the group consisting of $MgCl_2$, $MgF_2$ and $MgSO_4$.

11. The method according to claims 7, wherein the alkaline earth metal source contains no hydroxide of an alkaline earth metal.

12. A method for producing molten glass, which comprises heating the granules as defined in claim 1 to form molten glass.

13. The method for producing molten glass according to claim 12, wherein the granules are introduced onto a molten glass liquid surface in a melting furnace and melted.

14. The method for producing molten glass according to claim 12, wherein the granules are melted in a gas phase atmosphere to form molten glass particles, and the molten glass particles are collected.

15. A method for producing a glass product, which comprises forming the molten glass obtained by the method for producing molten glass as defined in claim 12, followed by annealing.

* * * * *